United States Patent

Fetzer et al.

[11] Patent Number: 6,153,161
[45] Date of Patent: Nov. 28, 2000

[54] PROCESS FOR REDUCING NO$_X$ FROM EXHAUST FUMES

[75] Inventors: Thomas Fetzer, Speyer; Bernd Morsbach, Ludwigshafen; Martin Hartweg, Erbach; Ralf-Dirc Roitzheim, Dornstadt; Andrea Seibold, Blaustein; Leonhard Walz, Rastatt, all of Germany

[73] Assignee: BASF Aktiengesellschaft, Ludwigshafen, Germany

[21] Appl. No.: 09/077,597

[22] PCT Filed: Dec. 11, 1996

[86] PCT No.: PCT/EP96/05532

§ 371 Date: Jun. 2, 1998

§ 102(e) Date: Jun. 2, 1998

[87] PCT Pub. No.: WO97/21482

PCT Pub. Date: Jun. 19, 1997

[30] Foreign Application Priority Data

Dec. 13, 1995 [DE] Germany ............... 195 46 612

[51] Int. Cl.$^7$ ............... B01J 8/02; B01J 23/72; B01J 23/60; B01J 23/02; B01J 23/32
[52] U.S. Cl. ............... 423/239.1; 423/213.2; 502/324; 502/325; 502/329; 502/331; 502/332; 502/342; 502/343; 502/345; 502/346; 502/524
[58] Field of Search ............... 423/239.1, 235, 423/213.2, 213.5; 502/524, 102, 305, 324, 340, 325, 329, 331, 332, 342, 343, 345, 346

[56] References Cited

U.S. PATENT DOCUMENTS 4,274,981 6/1981 Suzuki et al. ............... 502/524
4,963,520 10/1990 Yoo et al. ............... 502/524
5,587,135 12/1996 Fetzer et al. ............... 423/239

FOREIGN PATENT DOCUMENTS 042471 12/1981 European Pat. Off. .
4301470 1/1993 Germany .
44 20 932 6/1994 Germany .

*Primary Examiner*—Steven P. Griffin
*Assistant Examiner*—Maribel Medina
*Attorney, Agent, or Firm*—Keil & Weinkauf

[57] ABSTRACT

NO$_x$, where x is 1 and 2, in exhaust gases is reduced over heterogeneous catalysts with hydrocarbons, carbon monoxide, hydrogen or mixtures thereof in the presence of oxygen from 100 to 650° C. and an absolute pressure of from 0.5 to 50 bar by a process in which the heterogeneous catalysts used are bimodal or polymodal compounds of the general formula I $$A_{1-x}M_2O_4 \qquad (I),$$

which, if required, are doped with rare earth metals, noble metal, titanium, vanadium, molybdenum, tungsten or mixtures thereof, and where A is magnesium, calcium, titanium, vanadium, chromium, manganese, iron, cobalt, nickel, copper, zinc, tin or mixtures thereof, M is aluminum, gallium, indium, tin, chromium, manganese, iron, cobalt, nickel, copper, zinc or mixtures thereof and x is from 0 to 0.99, whose oxygen atoms are in a cubic close packed arrangement and A is present in the tetrahedral sites and M in the octahedral sites, it also being possible for A to occupy octahedral sites if an equivalent amount of M occupies tetrahedral sites.

11 Claims, 1 Drawing Sheet

PROCESS FOR REDUCING NO$_X$ FROM EXHAUST FUMES

The present invention relates to a process for the catalytic reduction of NO, NO$_2$ or mixtures thereof in exhaust gases, in particular combustion exhaust gases and especially combustion exhaust gases from internal combustion engines which are operated with air, preferably in excess, for example diesel and lean-mix engines, with the use of hydrocarbons, carbon monoxide, hydrogen or mixtures thereof as reducing agents.

The non-prior published DE-A-44 20 932 discloses that a specific copper/zinc spinel may be used for reducing NO$_x$ from automobile exhaust gases. These copper/zinc spinels are very difficult to prepare in a reproducible manner and exhibited insufficient resistance to SO$_2$ which is contained in the exhaust gases of diesel engines.

EP-A-42 471 discloses a process for the catalytic oxidation of carbon monoxide to carbon dioxide, in which the catalyst contains the metals copper, zinc and aluminum as metal oxides. At least 60% of the copper present is bound to the aluminum oxide as copper oxide/aluminum oxide spinel. From 1 to 20% by weight of zinc oxide are arranged in the cavities of the porous spinel. This catalyst is used in ammonia production for low-temperature conversion of CO.

DE-A-43 01 470 discloses a CuAl$_2$O$_4$ spinel which is combined with tin, lead and an element of Main Group II of the Periodic Table of the Elements as an oxide or a salt or in elemental form and then calcined to give a spinel. The known spinel of this type is used for decomposing N$_2$O.

The emissions of oxides of nitrogen in the modern industrial states are governed by the emitters comprising traffic and power stations and industrial plants fired by means of fossil fuels. While the power station and industrial emissions are declining through the construction of appropriate waste gas purification plants, the contribution of traffic is becoming more and more prevalent.

In the case of gasoline engines, the oxides of nitrogen can be reduced in a known manner by means of a three-way catalyst in a stoichiometric procedure, the uncombusted or partially oxidized components of the exhaust gas being ideally available in a stoichiometric ratio as a reducing agent for the resulting oxides of nitrogen.

In the diesel engine and in the lean-mix engine operated superstoichiometrically with an excess of air, this method of reducing oxides of nitrogen is in principle not possible owing to the superstoichiometric procedure. On the other hand, emissions of oxides of nitrogen from diesel engines, in particular in the direct injectors which have advantageous consumption and predominate in the commercial vehicle sector, account for a high proportion of the total emissions.

The advantageous consumption of lean-mix engines compared with engines with lambda regulation and three-way catalyst favors the increased use of lean-mix engines.

Noble metal-containing catalysts which, however, produce nitrous oxide (N$_2$O) in the reduction of the oxides of nitrogen in the presence of oxygen are also known.

It is an object of the present invention to remedy the abovementioned disadvantages.

We have found that this object is achieved by a novel and improved process for the reduction of NO$_x$, where x is 1 and 2, in exhaust gases over heterogeneous catalysts with hydrocarbons, carbon monoxide, hydrogen or mixtures thereof in the presence of oxygen at from 100 to 650° C. and an absolute pressure of from 0.5 to 50 bar, wherein the heterogeneous catalysts used are bimodal or polymodal compounds of the general formula I $$A_{1-x}M_2O_4 \qquad (I),$$

which, if required, are doped with rare earth metals, noble metals, titanium, vanadium, molybdenum, tungsten or mixtures thereof, and where A is magnesium, calcium, titanium, vanadium, chromium, manganese, iron, cobalt, nickel, copper, zinc, tin or mixtures thereof, M is aluminum, gallium, indium, tin, chromium, manganese, iron, cobalt, nickel, copper, zinc or mixtures thereof and x is from 0 to 0.99, whose oxygen atoms are in a cubic close packed arrangement and A is present in the tetrahedral sites and M in the octahedral sites, it also being possible for A to occupy octahedral sites if an equivalent amount of M occupies tetrahedral sites, preferably the abovementioned heterogeneous catalysts, with the proviso that they are not spinels which fulfill the following condition:

$$Cu_A Zn_B Al_C O_4,$$

where A+B+C=3 and A>0, B>0 and C>0.

Figure 1:
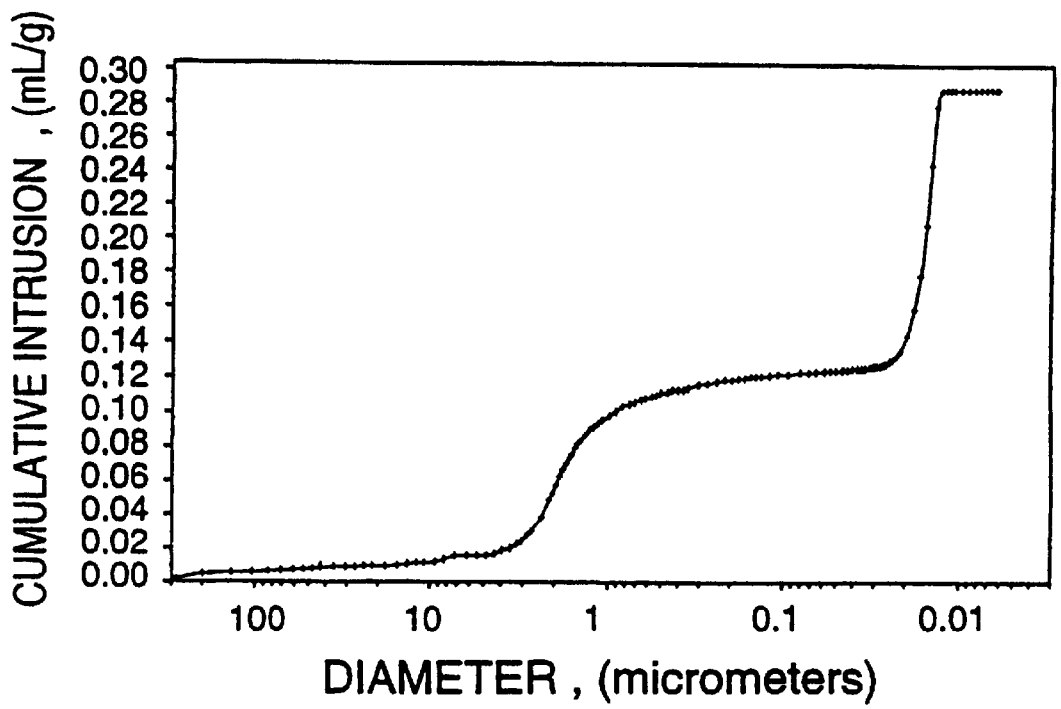
FIG. 1 is a plot of cumulative pore volume against pore diameter of the novel catalysts as discussed in detail in Example A.

The novel process can be carried out as follows:

The exhaust gas of a gas turbine, of a diesel engine or of a lean-mix engine is passed, after emerging, for example, from the gas turbine, from the engine or from the turbocharger, at from 100 to 650° C., preferably from 150 to 550° C., particularly preferably from 200 to 500° C., in particular from 300 to 450° C. and at an absolute pressure of from 0.5 to 50, preferably from 1 to 20, particularly preferably from 1 to 6, in particular from 1 to 3, bar and in general at a GHSV (Gas Hourly Space Velocity) of from 1000 to 200,000, preferably from 2000 to 150,000, particularly preferably from 5000 to 100,000, (1 (S.T.P.) of gas)/(1 of catalyst·h), preferably at the pressure prevailing at the gas turbine, at the engine outlet or at the turbocharger outlet, together with hydrocarbons, carbon monoxide, hydrogen, alcohols, such as methanol or ethanol, or mixtures thereof, over a novel catalyst. The catalyst may be in the form of pellets but is preferably present in a honeycomb structure. The honeycomb structure of the catalyst can be produced by extruding the catalytic material to give honeycombs having triangular, quadrilateral, polygonal or circular honeycomb channels or by coating carriers shaped in this manner with the catalytic material. Further embodiments are the coating and/or the impregnation of undulating metal sheets or fiber mats, which, for example, can be rolled or laid together to give a honeycomb structure, with the catalytically active material. The geometry of the honeycomb structure should be chosen so that the soot contained in the exhaust gas is not deposited on the honeycomb structure, thus leading to blockage of the honeycomb. During passage of the gas through the catalyst, oxides of nitrogen are reduced and at the same time the hydrocarbons and CO contained in the gas are oxidized. For the reduction of the oxides of nitrogen, hydrocarbons, preferably motor fuel, are metered into the exhaust gas; advantageously, however, the hydrocarbons contained in the exhaust gas and the CO present may also be sufficient for the reduction.

Suitable catalysts are those which can be prepared as follows:

The preparation of bimodal or polymodal, preferably bimodal, trimodal and tetramodal, particularly preferably bimodal and trimodal and in particular bimodal, heterogeneous catalysts is carried out as a rule according to the following principle:

Oxide particles of the general composition $M_2O$, $MO$, $M_2O_3$ or mixtures thereof, which have a particle size of from 1 to 1000 μm, preferably from 5 to 600 μm, particularly preferably from 10 to 500 μm, in particular from 20 to 200 μm, may be combined with hydroxide-containing particles, for example of the general composition $M(OH)$, $M(OH)_2$, $M(OH)_3$ and $MO(OH)$, for example by mechanical mixing, grinding in an edge mill or spray drying. These mixtures can be brought into a plastic foam, for example by kneading or grinding in an edge mill, can be extruded to give a molding (for example a solid extrudate, a hollow extrudate, a star extrudate or a honeycomb) and as a rule can be calcined. After a calcination, the resulting oxide, which as a rule has the general composition $M_2O$, $MO$, $M_2O_3$ or a mixture thereof, possesses a bimodal or polymodal pore distribution.

The component A can be either applied by impregnation or added to the mixture described above and the mixture kneaded and extruded. Calcination gives an oxide of the formal composition $AM_2O_4$, where A may assume the valencies +2, +4 or +6 and M the valencies +1, +2 or +3. These oxides, which essentially have a spinel, inverse spinel or defect spinel structure, have bimodal or polymodal pore distributions.

Preferably, one or more further elements of A, i.e. A', A", A"' etc., may be added to the oxides of the formal composition $AM_2O_4$, for example by impregnation, mechanical mixing or spraying, one or more further calcination steps, preferably one further calcination step, giving a solid (oxide) which corresponds to the general composition $(AA')M_2O_4$, $M(AA')M)O_4$, $(AA')_{0.99-0.01}M_2O_4$, $(AA'A'')M_2O_4$, $M(AA'A'')M)O_4$, $(AA'A'')_{0.99-0.01}M_2O_4$, $(AA'A''A''')M_2O_4$, $M(AA'A''A''')M)O_4$, $(AA'A''A''')_{0.99-0.01}M_2O_4$. These solids, which are the novel ready-prepared and used catalysts, have a bimodal or polymodal pore distribution.

The calcinations are carried out as a rule at from 300 to 1300° C., preferably from 500 to 1200° C., particularly preferably from 600 to 1100° C., and at from 0.1 to 200, preferably from 0.5 to 10, bar, particularly preferably at atmospheric pressure.

The oxidic solids obtained are partially or completely, i.e. to an extent of from 1 to 100, preferably from 10 to 90, particularly preferably from 20 to 70, % by weight, spinels $AM_2O_4$, inverse spinels $M(AM)O_4$ or optionally defect spinels of the composition $A_{l-x}M_2O_4$ in an $M_2O_3$ matrix or optionally defect inverse spinels of the composition $M(A_{l-x}M)O_4$ in an $M_2O_3$ matrix. These solids are distinguished by the fact that the oxygen atoms have a cubic close packed arrangement and A are present in the tetrahedral sites and M in the octahedral sites, it also being possible for A to occupy octahedral sites if the equivalent amount of M occupies tetrahedral sites.

Suitable elements M in the oxides of the composition $A_{l-x}O \cdot M_2O_3$ are aluminum, gallium, indium, tin, titanium, chromium, manganese, iron, cobalt, nickel, copper, zinc or mixtures thereof, preferably aluminum, gallium, manganese, iron, cobalt, nickel or mixtures thereof, particularly preferably aluminum and gallium, in particular aluminum.

x is from 0 to 0.99, preferably from 0 or 0.6 to 0.01, particularly preferably from 0 or 0.5 to 0.05.

Suitable elements A in the oxides of the composition $A_{l-x}O \cdot M_2O_3$ are magnesium, calcium, scandium, titanium, vanadium, chromium, manganese, iron, cobalt, nickel, copper, zinc, tin or mixtures thereof, preferably in the oxidation state +2, such as $Mg^{2+}$, $Ca^{2+}$, $Ti^{2+}$, $V^{2+}$, $Cr^{2+}$, $Mn^{2+}$, $Fe^{2+}$, $Co^{2+}$, $Ni^{2+}$, $Zn^{2+}$, $Sn^{2+}$ and $Cu^{2+}$ or mixtures thereof, particularly preferably $Mg^{2+}$, $Ca^{2+}$, $Mn^{2+}$, $Fe^{2+}$, $Co^{2+}$, $Ni^{2+}$, $Zn^{2+}$, $Sn^{2+}$ and $Cu^{2+}$ or mixtures thereof, in particular $Zn^{2+}$, $Mg^{2+}$, $Co^{2+}$, $Ni^{2+}$ and $Cu^{2+}$ or mixtures thereof. These may be used in the form of an element (metal), or as oxidic or salt-like compounds. Examples of salt-like compounds are carbonates, hydroxides, carboxylates, halides, halogenates, nitrites, nitrates, sulfites, sulfates, phosphite, phosphates, pyrophosphates, halites, and basic carbonates, preferably carbonates, hydroxides, carboxylates, nitrates, nitrites, sulfates, phosphates and basic carbonates, particularly preferably carbonates, hydroxides, basic carbonates and nitrates.

The novel catalysts are bimodal. For the purposes of the present invention, bimodal means that they contain mesopores (pore diameter<50 nm) and macropores (pore diameter 0.05–50 μm). The proportion of mesopores is from 40 to 99, preferably from 50 to 98, particularly preferably from 55 to 95, % by volume, based on the total pore volume of the novel catalysts. The proportion of macropores is from 1 to 60, preferably from 2 to 50, particularly preferably from 5 to 45, % by volume, based on the total pore volume of the novel catalysts. The novel catalysts may also be polymodal, i.e. they additionally contain pores in the range>50 μm. In this case, the proportion of pores having a diameter>50 μm is in general from 0.1 to 20, preferably from 1 to 15, particularly preferably from 2 to 10, % by volume, the abovementioned percentages for mesopores and macropores also being applicable for this case but being based on the total pore volume minus the volume of the pores having a diameter of >50 μm.

The BET surface areas of the novel catalysts are from 1 to 350, preferably from 10 to 200, particularly preferably from 30 to 140, $m^2/g$ and the porosities are from 0.01 to 0.8, preferably from 0.05 to 0.7, particularly from 0.1 to 0.6, ml/g.

EXAMPLES

Preparation of the Catalyst

Example A

A mixture of 173 g of $Al_2O_3$ (Puralox SCF® from Condea), 96 g of AlOOH (Pural SB® from Condea), 91 g of $Cu(NO_3)_2 \cdot 3H_2O$ (from Merck) and 116 g $Co(NO_3)_2 \cdot 6H_2O$ was kneaded with 14 ml of formic acid (dissolved in 130 ml of $H_2O$) for 1 h, extruded to give 3 mm solid extrudates, dried, and calcined for 4 hours at 800° C. at atmospheric pressure.

The material obtained after the calcination has a surface area (measured according to BET) of 106 $m^2/g$. It formally has the composition $Cu_{0.15}Co_{0.17}Al_2O_4$ and shows the typical diffraction lines of a spinel in the X-ray diffraction pattern.

146 g of the solid described above and having the composition $Cu_{0.16}Co_{0.17}Al_2O_4$ (water absorption: 0.5 ml/g) were impregnated twice with, in each case, 36.5 ml of an aqueous nitrous acid solution (pH 3) which contained 34 g of $Zn(NO_3)_2 \cdot 6H_2O$ and then left at room temperature for one hour. The impregnated carrier was dried at 120° C. to constant weight and finally calcined for 4 hours at 600° C.

The result was a catalyst of the formal composition $Zn_{0.39}Cu_{0.16}Co_{0.17}Al_2O_4$, which had the X-ray diffraction pattern of a spinel. The surface area of the catalyst (according to BET) was 66 $m^2/g$. The pore radius distribution was measured by the mercury porosimetry method (DIN 66 133). About 60% by volume of the pore volume are accounted for by pores having a diameter of <0.05 $\mu$m and about 30% by volume by pores in the range of 0.6–5 $\mu$m (FIG. 1). In FIG. 1, the cumulative pore volume (cumulative intrusion) in ml/g is plotted against the pore diameter in $\mu$m.

Example 1

The spinel used was a cobalt/copper/zinc/aluminum spinel of the composition $Zn_{0.39}Cu_{0.16}Co_{0.17}Al_2O_4$. 10 g of the spinel in the form of chips of the fraction from 1.6 to 2.0 mm were initially taken in a vertical quartz reactor (diameter 20 mm, height about 500 mm), in which a gas-permeable frit was arranged for holding the sample in the center of said reactor. The bed height was about 15 mm. Arranged around the quartz reactor was an oven which heated the central part of the reactor over a length of about 100 mm, temperatures up to 550° C. being achievable.

Figure 2:
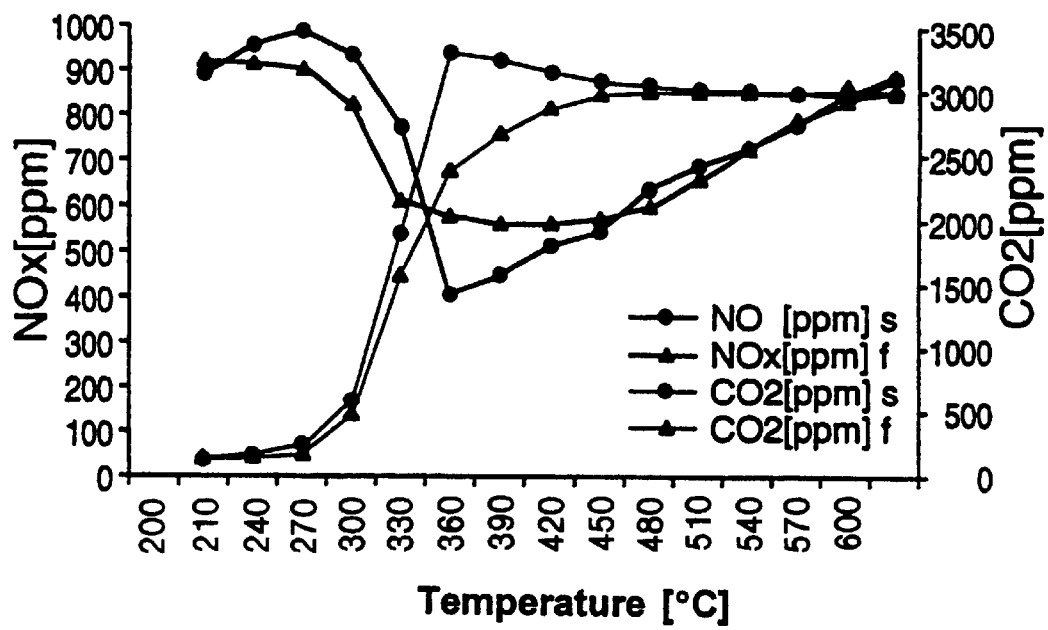
FIG. 2 is a plot of effluent gas concentrations against process temperature as discussed in detail in Example 1.

A gas mixture was passed through the catalyst and a GHSV of about 10,000 (l (S.T.P.) of gas)/l of catalyst·h), which mixture consisted of 1000 ppm of NO, 1000 ppm of propene, 10% of oxygen and argon (remainder) as carrier gas. The NO concentration was measured by means of a gas detector downstream of the reactor, any $NO_2$ formed being reduced to NO in a converter before the detection. At the same time, oxidation of hydrocarbons to $CO_2$ was observed by measuring the $CO_2$ content by the gas detector. The result of the measurement is shown in a graph in FIG. 2. The curve of the $NO_x$ and of the $CO_2$ content in ppm is plotted as a function of the temperature, the $NO_x$ concentration being indicated by the thicker line. The graph shows a substantial decrease in the $NO_x$ concentration with increasing temperature, said concentration passing through a broad minimum in the range of 300–450° C. and then increasing again. At the same time, the hydrocarbons are converted into $CO_2$, as indicated by the increase in the $CO_2$ concentration.

Advantageously, these are roughly the temperatures which can occur in an exhaust gas line of an internal combustion engine. Investigations into this catalyst furthermore indicated high resistance to $NO_x$, water and carbon dioxide.

We claim:

1. A process for the reduction of NO, $NO_2$ or mixtures thereof, in exhaust gases over heterogeneous catalysts with hydrocarbons, carbon monoxide, hydrogen or mixtures thereof at 100 to 650° C. and an absolute pressure of 0.5 to 50 bar, wherein the exhaust gases are those from a lean-mix engine operated superstoichiometrically with an excess of air, wherein the heterogeneous catalysts are bimodal or polymodal compounds of the formula I $$A_{1-x}M_2O_4 \qquad (I),$$

which, optionally, are doped with rare earth metals, noble metals, titanium, vanadium, molybdenum, tungsten or mixtures thereof, and where A is selected from the group consisting of magnesium, calcium, titanium, vanadium, chromium, manganese, iron, cobalt, nickel, copper, zinc, tin and mixtures thereof, M is selected from the group consisting of aluminum, gallium, indium, tin, chromium, manganese, iron, cobalt, nickel, copper, zinc and mixtures thereof and x is from 0 to 0.99, whose oxygen atoms are in a cubic close packed arrangement and A is present in the tetrahedral sites and M in the octahedral sites, it also being possible for A to occupy octahedral sites if an equivalent amount of M occupies tetrahedral sites.

2. The process of claim 1, wherein the heterogeneous catalysts used are bimodal or polymodal compounds I, with the proviso that they are not spinels which fulfill the following condition:

$$Cu_A Zn_B Al_C O_4,$$

where A+B+C=3 and A>0, B>0 and C>0.

3. A process as claimed in claim 1 for the reduction of $NO_x$ in exhaust gases, wherein the bimodal or polymodal heterogeneous catalysts are prepared by a method in which an oxide of M, which, if required, is impregnated with a metal salt of A, is thoroughly mixed with a hydroxide, polyisooxoanion or oxide hydroxide of M and calcined at 300 to 1300° C. and from 0.1 to 200 bar and then, if required, impregnated with a further metal salt of A and calcined.

4. The process of claim 1, wherein the exhaust gases are combustion exhaust gases.

5. The process of claim 1, wherein the exhaust gases are those from internal combustion engines and combustion engines.

6. The process of claim 1, wherein heterogeneous catalysts having a BET surface area of 1 to 350 $m^2/g$ are used.

7. The process of claim 1, wherein heterogeneous catalysts having a porosity of 0.01 to 1 ml/g are used.

8. The process of claim 1, wherein heterogeneous catalysts having a CuO content of 0.1 to 50% by weight are used.

9. The process of claim 1, wherein heterogeneous catalysts to which, after calcination, palladium, platinum, rhodium, ruthenium, osmium, iridium, rhenium or mixtures thereof are applied as noble metals are used.

10. The process of claim 1, wherein heterogeneous catalysts which are doped with 0.05 to 10% by weight of oxides of groups IIIb, IVb, Vb, VIb, VIIb or mixtures thereof are used.

11. The process of claim 1, wherein the exhaust gases are those from a diesel engine.

* * * * *

UNITED STATES PATENT AND TRADEMARK OFFICE
CERTIFICATE OF CORRECTION

PATENT NO.   : 6,153,161
DATED        : November 28, 2000
INVENTOR(S)  : Fetzer et al.

It is certified that error appears in the above-identified patent and that said Letters Patent is hereby corrected as shown below:

<u>Title page,</u>
Item [73] should read:
-- [73] Assignees: BASF Aktiengesellschaft, Ludwigshafen, Germany and Daimler Benz AG, Stuttgart, Germany --.

<u>Column 6, claim 3,</u>
Lines 30 and 31, delete "A process as claimed in claim 1 for the reduction of $NO_x$ in exhaust gases" and substitute -- The process of claim 1 --.

<u>Column 6, claim 3,</u>
Line 36, delete "from".

Signed and Sealed this

Twenty-fifth Day of September, 2001

*Attest:*

*Nicholas P. Godici*

*Attesting Officer*

NICHOLAS P. GODICI
*Acting Director of the United States Patent and Trademark Office*